United States Patent [19]

Maas

[11] Patent Number: 4,499,425
[45] Date of Patent: Feb. 12, 1985

[54] PHASE VELOCITY SIGN DETECTOR FOR FREQUENCY SHIFT KEY DEMODULATION

[75] Inventor: Michael F. Maas, White Bear Lake, Minn.

[73] Assignee: Honeywell Inc., Minneapolis, Minn.

[21] Appl. No.: 404,959

[22] Filed: Aug. 4, 1982

[51] Int. Cl.³ .................. H03D 13/00; H03K 9/06; H04L 27/14

[52] U.S. Cl. .................. 329/50; 307/526; 328/134; 329/107; 329/110; 375/88; 375/94

[58] Field of Search .............. 329/50, 107, 110; 375/88, 94; 307/525, 526; 328/133, 134

[56] References Cited

U.S. PATENT DOCUMENTS 4,264,866 4/1981 Benes .................. 328/134

FOREIGN PATENT DOCUMENTS 746862 7/1980 U.S.S.R. .................. 329/107

Primary Examiner—Eugene R. Laroche
Assistant Examiner—Robert J. Pascal
Attorney, Agent, or Firm—Theodore F. Neils; David R. Fairbairn

[57] ABSTRACT

A frequency shift key receiver includes a phase velocity sign detector which detects whether a FSK modulated input signal has a frequency ($f_{FSK}$) which is greater than or less than a reference frequency ($f_0$) of a REF signal. The phase velocity sign detector includes a sequence generator which generates a two bit binary code which represents the phase angle between the FSK and REF signals. The sequence of the code indicates the sign of the phase velocity between the FSK and REF signals. The phase velocity sign detector includes a sequence detector which provides an output signal indicating whether the FSK signal has a frequency greater than or less than the REF signal based upon the sequence of the code from the sequence generator. The phase velocity sign detector demodulates the FSK signal in the digital domain using circuitry which is completely integrable on a monolithic integrated circuit chip.

25 Claims, 6 Drawing Figures

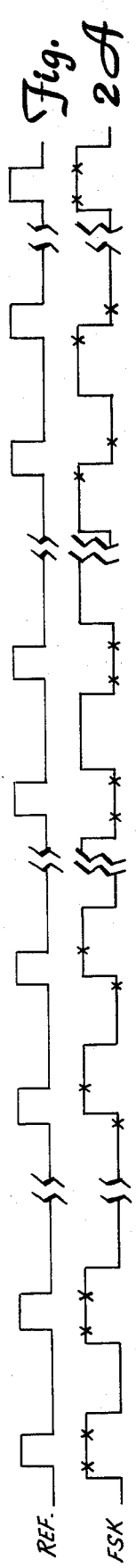
Fig. 2A ($f_{FSK} < f_0$)
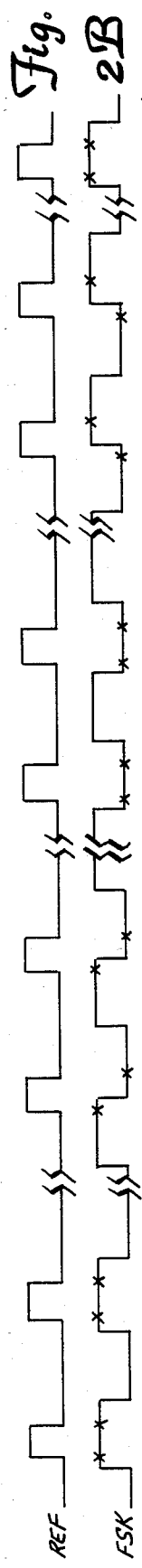
Fig. 2B ($f_{FSK} > f_0$)
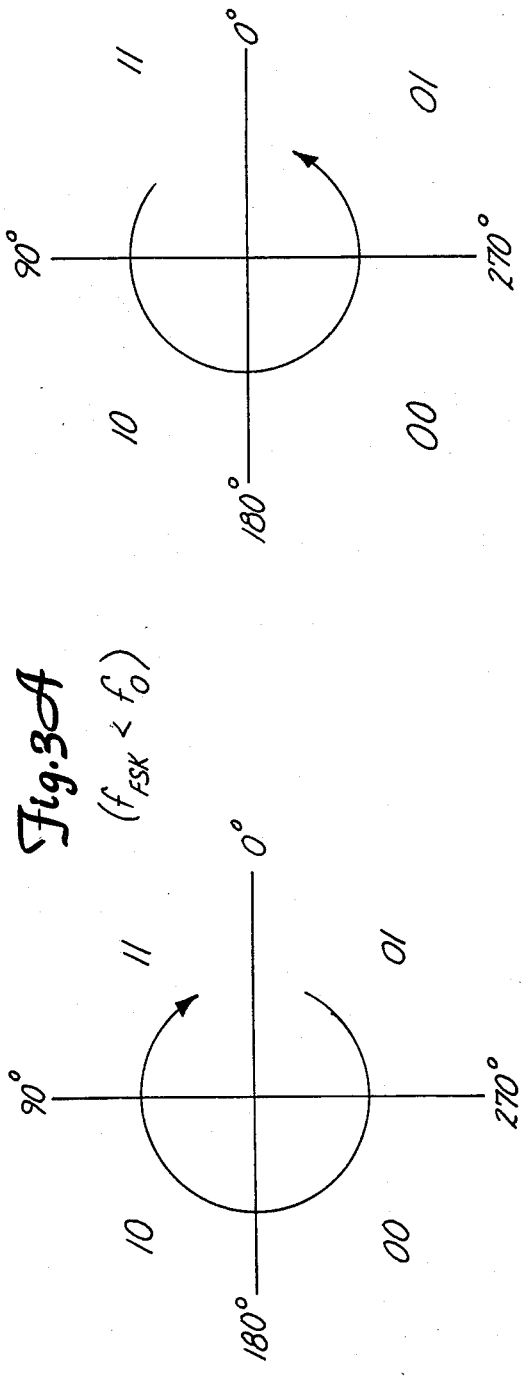
Fig. 3A ($f_{FSK} < f_0$)
Fig. 3B ($f_{FSK} > f_0$)

PHASE VELOCITY SIGN DETECTOR FOR FREQUENCY SHIFT KEY DEMODULATION

Reference is hereby made to a copending application by Michael F. Maas and Max S. Hendrickson, Ser. No. 404,955, entitled "Frequency Shift Key Demodulator" which was filed on even date with the present application and is assigned to the same assignee.

BACKGROUND OF THE INVENTION

1. Field of the Invention

The present invention relates to circuitry for detecting deviation in frequency of an input signal with respect to a reference signal. In particular, the present invention relates to digital circuitry for demodulating frequency shift key data transmissions.

2. Description of the Prior Art

With the ever-increasing use of digital computers and other digital electronic circuitry, the transmission of digital data has become extremely important. One digital data transmission format which has been utilized is frequency shift key (FSK) transmission. An FSK transmitter modulates a reference frequency signal based upon the data to be transmitted so that the transmitted signal has a frequency ($f_{FSK}$) which is either slightly greater than or slightly less than the frequency ($f_0$) of the reference signal (i.e. $f_{FSK}=f_0\pm\Delta f$). The frequency of the transmitted FSK signal, therefore, represents either a digital "1" or a digital "0". An FSK receiver receives and demodulates the transmitted FSK signal to produce a serial data stream based upon the frequency of the FSK signal representing each bit of the data stream.

Narrow band FSK transmission, in which the frequency deviation of the FSK modulated signal from the reference or center frequency is very small, offers significant advantages. Because the FSK modulated signal is present only within a narrow frequency band, the narrow band FSK receiver can use a very high Q filter to remove all noise contained in the frequency spectrum except for the narrow band containing the FSK signal. High noise immunity, therefore, can be achieved by using narrow band FSK transmission.

There is a continuing need for improved FSK receiver circuitry which is capable of detecting narrow deviation in frequencies of the input signal with respect to a reference frequency, which requires short operating times, and which has good noise immunity. In addition, due to the ever increasing use of integrated circuits, there is need for FSK receiver circuitry which utilizes a minimum of components and which is completely integrable on a monolithic integrated circuit chip.

SUMMARY OF THE INVENTION

The present invention is a circuit for detecting differences in frequency between an input signal (FSK) and a reference signal (REF). The circuit includes sequence generator means for producing a digital code representative of a phase angle between the FSK and REF signals. The digital code (which is preferably a two bit binary code) changes in a first predetermined sequence when the frequency of the FSK signal is less than the frequency of the REF signal, and changes in a second predetermined sequence when the frequency of the FSK signal is greater than the frequency of the REF signal.

The circuit of the present invention further includes sequence detector means which receives the digital code from the sequence generator means. The sequence detector means produces a signal which has a first state in response to the first sequence and has a second state in response to the second sequence.

In preferred embodiments of the present invention, the FSK and REF signals are square wave signals having different duty cycles. The sequence generator means provides the first bit of the binary code as a function of the state of the FSK signal at the rising edge of the REF signal. The sequence generator means provides the second bit as a function of the state of the FSK signal at the falling edge of the REF signal.

The sequence detector means preferably includes a plurality of flipflops for latching data at each of a plurality of predetermined transitions of the sequence generator. Each time one of the bits of the binary code changes, one of the flipflops stores a signal based upon the state of the other bit of the code. The sequence which is detected is based upon a combination of the outputs of the flipflops.

In a preferred embodiment, the flipflops must all have the same state in order to indicate the presence of one of the two predetermined sequences. If the transitions of the binary code do not correspond to the selected sequence, the outputs of all of the flipflops will not have the same predetermined state at the same time.

BRIEF DESCRIPTION OF THE DRAWINGS

FIG. 2A shows the phase relationship between the REF and FSK signals, and the two bit binary code produced when the frequency of FSK is less than the frequency of REF.

FIG. 2B shows the phase relationship between the REF and FSK signals, and the two bit binary code generated when the frequency of FSK is greater than the frequency of REF.

FIG. 3A is a phase diagram showing the phase angle between REF and FSK when the frequency of FSK is less than the frequency of REF.

FIG. 3B is a phase diagram showing a phase relationship between FSK and REF when the frequency of FSK is greater than the frequency of REF.

DETAILED DESCRIPTION OF THE PREFERRED EMBODIMENTS

Figure 1:
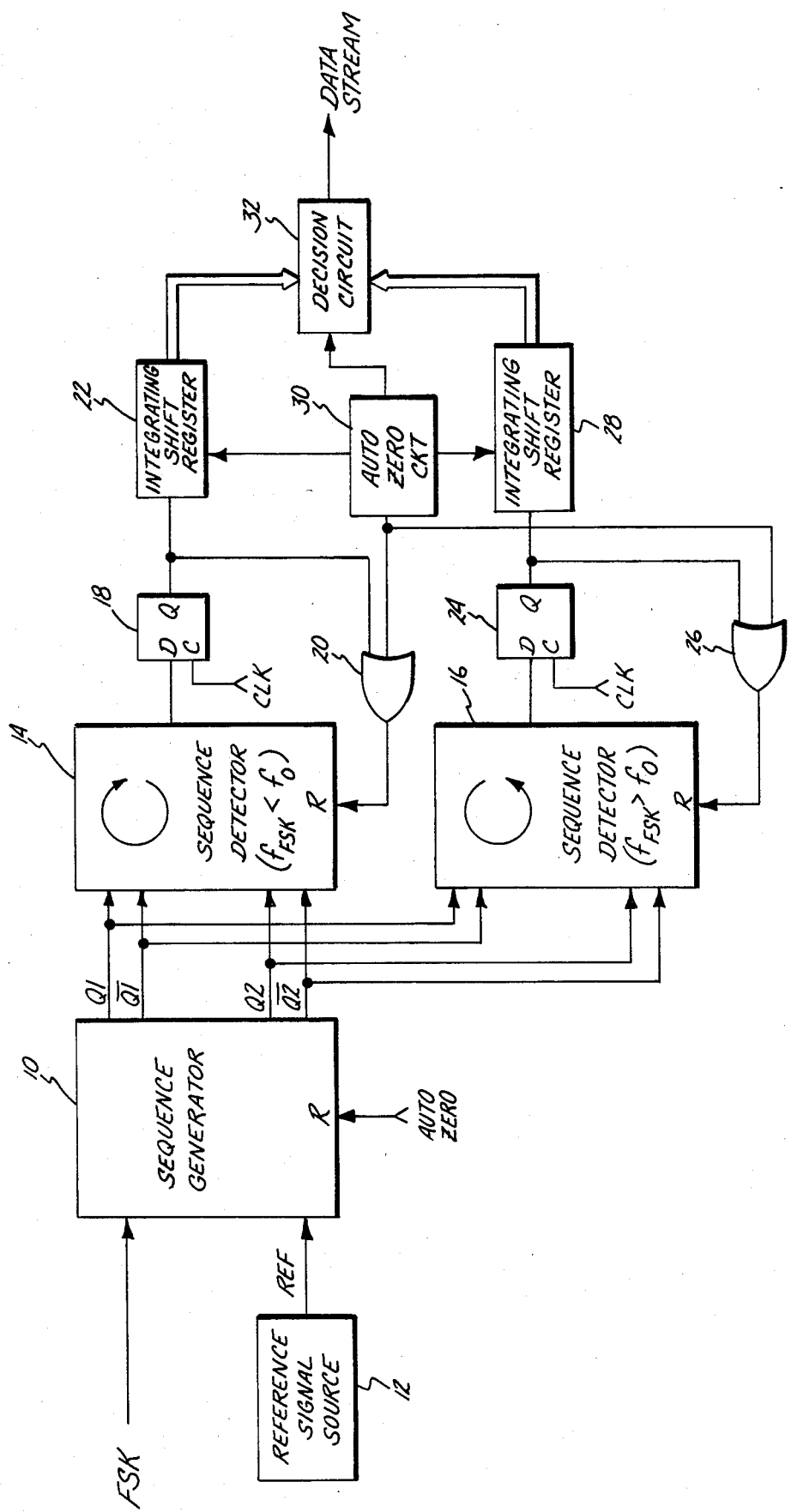
FIG. 1 is a block diagram of an FSK receiver which includes the phase velocity sign detector of the present invention.

FIG. 1 shows a frequency shift key receiver which converts an FSK input signal to a digital data stream. The FSK signal is a squarewave signal having a frequency which represents the state of one bit of transmitted data. When $f_{FSK}=f_0+\Delta f$, where $f_0$ is a reference frequency, the data bit is a "1". When, on the other hand, $f_{FSK}=f_0-\Delta f$, the FSK signal represents a digital "0".

The FSK signal is received at one input of sequence generator 10. Reference signal source 12 provides a reference (REF) signal which has the reference frequency $f_0$. In a preferred embodiment of the present invention, the FSK signal has a fifty percent duty cycle, while the REF signal is a squarewave signal having a twenty-five percent duty cycle.

Sequence generator 10 latches the state of the FSK signal on the rising and falling edges of the REF signal to produce a two bit binary code. The first bit (Q1) corresponds to the state of the FSK signal on the rising edge of the REF signal, while the second bit (Q2) corresponds to the state of the FSK signal when the falling edge of the REF signal occurs. The two bit binary code generated by sequence generator 10 is a function of the phase angle between the FSK and REF signals. Because the frequencies of the FSK and REF signals are different, the phase angle between the FSK and REF signals will change with time. As a result, the two bit binary code will change in one of two known sequences, depending upon whether $f_{FSK}$ is greater than or less than $f_0$. These sequences indicate the sign of the phase velocity between the FSK and REF signals. By detecting the sequence, it is possible to determine the sign of the phase velocity, and thus provide an indication of whether the FSK signal represents a "1" or a "0".

In the embodiment shown in FIG. 1, a pair of sequence detectors 14 and 16 each receive the two bit binary code. Sequence detector 14 detects the sequence which indicates that $f_{FSK}$ is less than $f_0$, while sequence detector 16 detects the sequence which indicates that $f_{FSK}$ is greater than $f_0$. Both sequence detectors 14 and 16 receive the Q1 and Q2 signals, together with their respective complementary signals ($\overline{Q1}$ and $\overline{Q2}$).

When sequence detector 14 detects its predetermined sequence, its output goes high. The output of sequence detector 14 is supplied to the D input of flipflop 18. Flipflop 18 receives the CLK signal at its clock (C) input. The CLK signal has the same frequency as the REF signal, but is shifted in phase. The Q output of flipflop 18 is supplied through OR gate 20 to the reset (R) input of sequence detector 14, thus causing sequence detector 14 to be reset each time that it detects a sequence. The output of flipflop 18 is also supplied to integrating shift register 22. Each time a sequence is detected by sequence detector 14, the output of flipflop 18 goes high for one pulse of the CLK signal (until sequence detector 14 is reset). Integrating shift register 22 accumulates the number of times that sequence detector 14 detects the presence of a sequence.

Similarly, the output of sequence detector 16 goes high when it detects its predetermined sequence. The output of sequence detector 16 is supplied to the D input of flipflop 24. The CLK signal is supplied to the clock (C) input of flipflop 24, and the Q output of flipflop 24 is supplied to OR gate 26 and integrating shift register 28. When sequence detector 16 detects a sequence, it is reset through flipflop 24 and OR gate 26. The number of times that sequence detector 16 detects a sequence is accumulated by integrating shift register 28.

The FSK signal has a predetermined baud rate, which determines the time period during which integrating shift registers 22 and 28 accumulate output signals from sequence detectors 14 and 16. For example, in one embodiment in which the baud rate is 360 Hz, the time period for detecting sequences and accumulating them in shift registers 22 and 28 is 1/360th of a second. Auto zero circuit 30 provides signals to sequence generator 10, sequence detector 14 (through OR gate 20), sequence detector 16 (through OR gate 26), integrating shift registers 22 and 28, and decision circuit 32 at the end of each time period. These signals from auto zero circuit 30 cause decision circuit 32 to provide an output data bit which is a "1" if integrating shift register 28 contains the larger count, and which is a "0" if integrating shift register 22 contains the larger count. The signal from the auto zero circuit 30 resets sequence generator 10, sequence detectors 14 and 16, and integrating shift registers 22 and 28 so that the next bit represented by the FSK signal can be detected.

The use of two sequence detectors 14 and 16 and two parallel integrating shift registers 22 and 28 permits an accurate demodulation of the FSK signal into the digital data stream without requiring auto zero circuit 30 to be precisely synchronized to the FSK signal.

FIGS. 2A, 2B, 3A and 3B illustrate the operation of sequence generator 10, which produces a two bit binary code which indicates the phase angle between the FSK and REF signals. The sequential change of the two bit binary code provides an indication of the sign of the phase angle from which it is possible (by means of sequence detectors 14 and 16) to determine whether $f_{FSK}$ is greater than or less than $f_0$.

In FIG. 2A, the REF and FSK signals are shown for the case where $f_{FSK}$ is less than $f_0$. Also shown are the values of Q1 and Q2 (i.e. the two bit binary code) generated by sequence generator 10.

As shown in FIG. 2A, the Q1 bit represents the state of the FSK signal at the occurrence of the rising edge of the REF signal. The Q2 bit represents the state of the FSK signal at the occurrence of the trailing edge of the REF signal.

In the example shown in FIG. 2A, the FSK signal is initially high at both the leading and trailing edges of the REF signal, so that both Q1 and Q2 are "1" and the two bit binary code is "11". Because $f_{FSK}$ is less than $f_0$, the period of the FSK signal is greater than the period of the REF signal. Thus the leading edge of the FSK signal gradually shifts to the right with respect to the leading edge of the REF signal. As shown in FIG. 2A, the rising edge of the FSK signal eventually shifts to the right of the rising edge of the REF signal and the two bit binary code changes to "01".

As time further progresses, the longer period of the FSK signal causes the binary code to shift from "01" to "00" and then from "00" to "10". As time further progresses, the phase angle between the FSK and REF signals continues to shift until the two bit binary code changes from "10" back to "11". This sequence continues as long as $f_{FSK}$ is less than $f_0$.

FIG. 2B illustrates the REF and FSK signals and the two bit binary code generated when $f_{FSK}$ is greater than $f_0$. In this latter case, the period of the FSK signal is slightly less than the period of the REF signal, so that the rising edge of the FSK signal shifts gradually to the left with respect to the rising edge of the REF signal. As a result, the two bit binary code changes from "11" to "10", then to "00", then to "01", and finally back to "11".

The time required to complete one cycle of either the sequence shown in FIG. 2A or the sequence shown in FIG. 2B is equal to one period of the difference frequency $\Delta f$, (where $f_{FSK} = f_0 \pm \Delta f$).

FIGS. 3A and 3B show the phase angle between the FSK and REF signals for the two cases illustrated in FIGS. 2A and 2B, respectively. As shown in FIGS. 3A and 3B, the binary code "11" represents the phase angle from 0° to 90°; the binary code "10" represents the phase angle from 90° to 180°; the binary code "00" represents the phase angle from 180° to 270°; and the binary code "01" represents the phase angle from 270° to 360° (or 0°). The sequence illustrated in FIG. 2A is depicted in FIG. 3A as a clockwise rotation of the phase angle, while the sequence illustrated in FIG. 2B is depicted in FIG. 3B as a counterclockwise rotation of the phase angle.

The use of a fifty percent duty cycle FSK signal and a 25 percent duty cycle REF signal allows the four values of the binary code to each represent 90° of the phase angle. If the duty cycle of the REF signal is greater than 25 percent, the "11" and "00" values of the code represent less than 90°, while the "10" and "01" values represent greater than 90°. This means that the correspondence between the two bit binary code sequence and phase angle has become skewed. Although the present invention is still effective even though the sequence is skewed with respect to phase angle, the use of an REF signal which has a duty cycle of 25 percent and an FSK signal with a duty cycle of 50 percent is preferred, since skewing is avoided.

Figure 4:
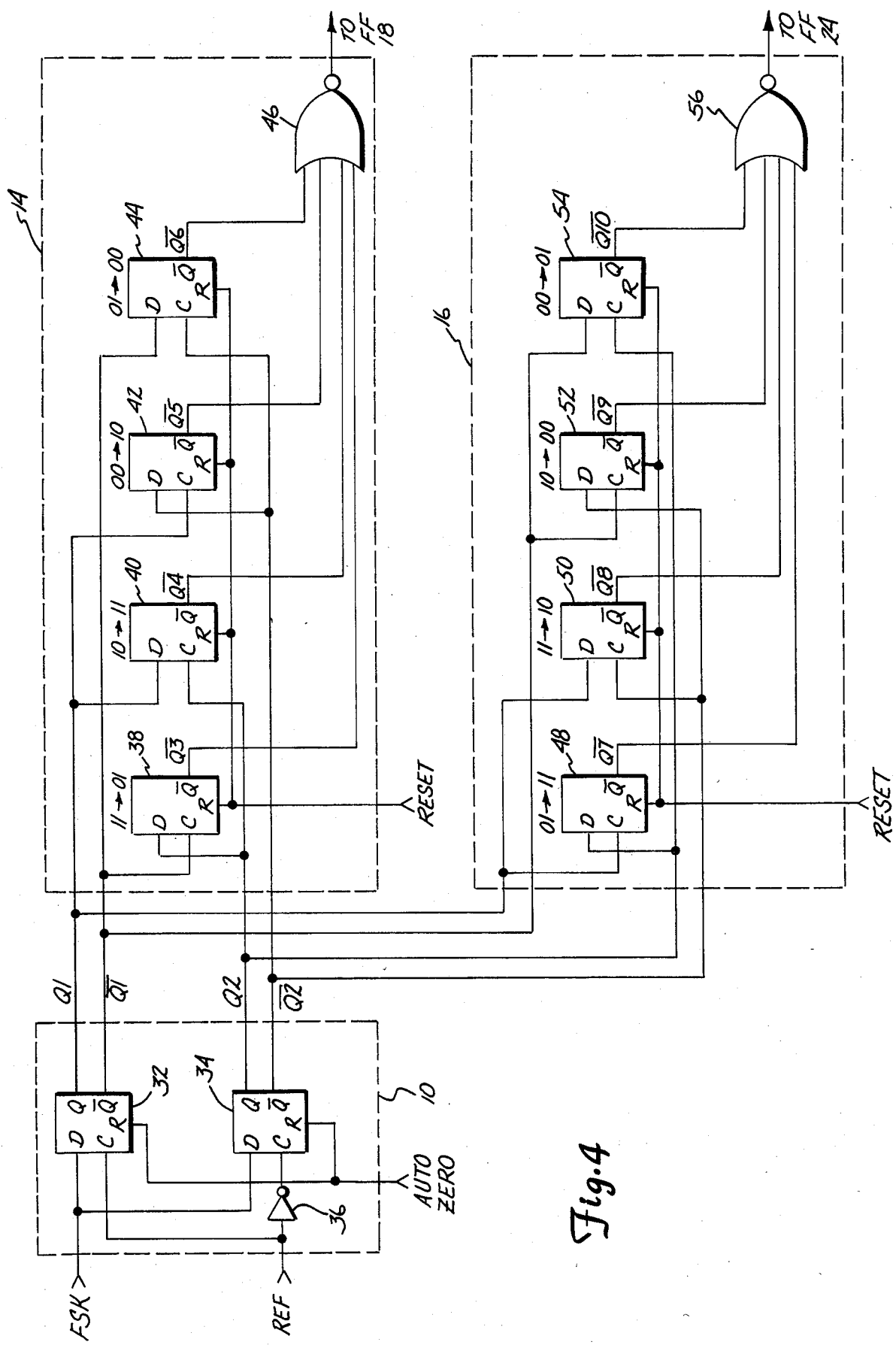
FIG. 4 is an electrical block diagram showing a preferred embodiment of the sequence generator and sequence detectors of the circuit of FIG. 1.

FIG. 4 shows the construction of sequence generator 10 and sequence detectors 14 and 16 in a preferred embodiment of the present invention. As shown in FIG. 4, sequence generator 10 is formed by a pair of flipflops 32 and 34 and inverter 36. The FSK signal is supplied to the D inputs of flipflops 32 and 34. The REF signal is supplied to the clock (C) input of flipflop 32, and is supplied through inverter 36 to the clock (C) input of flipflop 34. Flipflop 32 generates the Q1 and $\overline{Q1}$ values, while flipflop 34 generates the Q2 and $\overline{Q2}$ output values. The Q1 output of flipflop 32 corresponds to the state of the FSK signal supplied to the D input of flipflop 32 upon the occurrence of the rising edge of the REF signal. The Q2 output of flipflop 34 corresponds to the value of the FSK signal at the D input of flipflop 34 at the trailing edge of the REF signal (due to the inversion of the REF signal by inverter 36.)

Sequence detector 14 detects the sequence illustrated in FIGS. 2A and 3A. As shown in FIG. 4, sequence detector 14 includes flipflops 38, 40, 42, and 44 and NOR gate 46. Sequence detector 14 receives the Q1, $\overline{Q1}$, Q2, and $\overline{Q2}$ signals, as well as a reset signal from OR gate 20 (FIG. 1), and provides an output to flipflop 18 which is a digital "1" when the sequence illustrated in FIGS. 2A and 3A is detected. Unless the desired sequence occurs, the output of sequence detector 14 remains "0". The $\overline{Q3}$, $\overline{Q4}$, $\overline{Q5}$, and $\overline{Q6}$ outputs of flipflops 38, 40, 42 and 44, respectively, are supplied to NOR gate 46. The output of NOR gate 46 goes high ("1"), indicating the detection of a sequence only when all four inputs ($\overline{Q3}$-$\overline{Q6}$) are all low. If any one of the four inputs $\overline{Q3}$-$\overline{Q6}$ is high, the output of NOR gate 46, and thus the output of sequence detector 14 remains low ("0").

Each one of the flipflops 38, 40, 42 and 44 detects one of the four transitions of the clockwise sequence of the two bit binary code. Flipflop 38 detects the "11" to "01" transition. Flipflop 40 detects the "10" to "11" transition. Flipflop 42 detects the "00" to "10" transition. Flipflop 44 detects the "01" to "00" transition.

Flipflop 38 receives $\overline{Q2}$ at its D input and Q1 at its C input. The $\overline{Q3}$ output of flipflop 38 is latched "0" when a "11" to "01" transition occurs.

Flipflop 40 receives Q1 at its D input and Q2 at its C input. The $\overline{Q4}$ output of flipflop 40 is latched "0" when a "10" to "11" transition occurs.

Flipflop 42 receives $\overline{Q2}$ at its D input and Q1 at its C input. The $\overline{Q5}$ output of flipflop 42 is latched "0" when a "00" to "10" transition occurs.

Flipflop 44 receives $\overline{Q1}$ at its D input and and $\overline{Q2}$ at its C input. The $\overline{Q6}$ output of flipflop 44 is latched "0" when a "01" to "00" transition occurs.

To illustrate the operation of sequence detector 14, consider the example shown in FIG. 2A when auto zero circuit 30 provides a reset signal which resets sequence generator 10 as well as sequence detectors 14 and 16. The reset signal is supplied to the reset inputs of flipflops 38, 40, 42, and 44, thus causing $\overline{Q3}$-$\overline{Q6}$ to all be "1". NOR gate 46 is, therefore, "disabled" (i.e. the output is "0") four times over. The auto zero reset signal also resets flipflops 32 and 34 of sequence generator 10, so that Q1 and Q2 are both "0" and the two bit binary code is "00". In this example, as soon as the auto zero reset is removed from sequence 10, Q1 changes from 0 to 1, and then Q2 changes from 0 to 1, since the first binary code in the sequence shown in FIG. 2A is "11".

Because Q1 changes to "1" first, while Q2 is still "0", flipflop 42 is initially latched, and $\overline{Q5}$ goes low. As soon as Q2 changes to "1", flipflop 40 detects the "10" to "11" transition and $\overline{Q4}$ latches to a "0". At this time, NOR gate 46 still remains disabled due to $\overline{Q3}$ and $\overline{Q6}$ still being "1".

After the binary code remains "11" for a period of time, a transition occurs from "11" to "01". This transition is detected by flipflop 38, and $\overline{Q3}$ is latched as "0". NOR gate 46 still remains disabled due to $\overline{Q6}$ being "1".

The next transition of the sequence occurs when the binary code changes from "01" to "00". This transition is detected by flipflop 44, which causes $\overline{Q6}$ to be "0". At this time, all four inputs $\overline{Q3}$-$\overline{Q6}$ are "0", and the output of NOR gate 46 switches to "1", indicating that the clockwise sequence has been detected. The "1" output of sequence detector 14 is supplied to flipflop 18 of FIG. 1, which is clocked by the CLK signal to supply a "1" to integrating shift register 22, and to supply a reset signal through OR gate 20 to the reset inputs of flipflops 38, 40, 42 and 44. This causes the output of NOR gate 46 to return to "0", and the sequence detection process is restarted.

It can be seen that sequence detector 14 provides a "1" output whenever the clockwise sequence is present. This occurs regardless of where the sequence starts (i.e. it does not have to start with "11" as in this example in order to be detected). The clockwise sequence will be detected by sequence detector 14 regardless of where the sequence starts within one cycle of the difference frequency Δf.

Sequence detector 14 will not provide a "1" output when the counterclockwise sequence illustrated in FIGS. 2B and 3B is presented. Assuming once again that auto zero circuit 30 has supplied an auto zero reset to sequence generator 10 and sequence detector 14, the binary code is initially "00" and the output of NOR gate 46 is "0", since $\overline{Q3}$-$\overline{Q6}$ are all "1".

As soon as the auto zero reset is removed, Q1 changes to "1", which causes $\overline{Q5}$ to be latched to "0". Q2 then changes to "1" which is detected by flipflop 40 as a "10" to "11" transition, and $\overline{Q4}$ is latched to "0". NOR gate 46 remains disabled, however, due to $\overline{Q3}$ and $\overline{Q6}$ being "1".

The next transition shown in FIGS. 2B and 3B is from "11" to "10". This transition causes flipflop 44 to be latched, since $\overline{Q2}$ switches from "0" to "1". The D input to flipflop 44 is $\overline{Q1}$, which is "0". $\overline{Q6}$, therefore, is latched "1", which maintains NOR gate 46 disabled.

The next transition of the counterclockwise sequence shown in FIGS. 2B and 3B is from "10" to "00". This transition causes flipflop 38 to be clocked by the change of $\overline{Q1}$ from "0" to "1". Since Q2 is "0", the $\overline{Q3}$ output of flipflop 38 is latched "1", which provides a further disable to NOR gate 46.

The next transition in the counterclockwise sequence of FIGS. 2B and 3B is from "00" to "01". This transition causes flipflop 40 to be clocked. Since Q1 supplied to the D input of flipflop 40 is "01", the $\overline{Q4}$ output of flipflop 40, (which had been previously latched as "0") is switched to "1". NOR gate 46 is now disabled three times over by $\overline{Q3}$, $\overline{Q4}$ and $\overline{Q6}$ all being "1".

The next transition of the counterclockwise sequence is from "01" to "11". This transition causes flipflop 42 to be clocked. Since $\overline{Q2}$ supplied to the D input of flipflop 42 is "0", the $\overline{Q5}$ output of flipflop 42 (which had initially been latched "0" immediately after the auto zero reset had been removed) switches to "1". All four inputs to NOR gate 46 are now "1", and NOR gate 46 is disabled four times over. As the counterclockwise sequence continues, flipflops 38, 40, 42, and 44 continue to remain in states which leave $\overline{Q3}$-$\overline{Q6}$ latched as "1". Thus the output of sequence detector 14 remains "0" as long as the counterclockwise sequence is present.

Sequence detector 16 is similar in construction to sequence detector 14, except that it provides a "1" output when the counterclockwise sequence is present, and provides a "0" output when the clockwise sequence is present. Sequence detector 16 includes flipflops 48, 50, 52, and 54 and NOR gate 56. Flipflop 48 receives Q2 at its D input and Q1 at its C input. The $\overline{Q7}$ output of flipflop 48 is latched "0" when a "01" to "11" transition occurs.

Flipflop 50 receives Q1 at its D input and $\overline{Q2}$ at its C input. The $\overline{Q8}$ output of flipflop 50 is latched "0" when a "11" to "10" transition occurs.

Flipflop 52 receives $\overline{Q2}$ at its D input and $\overline{Q1}$ at its C input. The Q9 output of flipflop 52 is latched "0" upon the occurrence of a "10" to "00" transition.

Flipflop 54 receives $\overline{Q1}$ at its D input and Q2 at its C input. The $\overline{Q10}$ output of flipflop 54 is latched "0" upon the occurrence of a "00" to "01" transition.

The $\overline{Q7}$-$\overline{Q10}$ outputs of flipflops 48, 50, 52 and 54 are supplied to the inputs of NOR gate 56. Only when $\overline{Q7}$-$\overline{Q10}$ are all "0" will the output of NOR gate 56, and therefore the output of sequence detector 16, be "1". A reset signal is supplied to the reset inputs of flipflops 48, 50, 52, and 54 through OR gate 26 (FIG. 1). Whenever the output of NOR gate 56 changes to "1", flipflop 24 supplies a "1" to integrating shift register 28, and supplies a reset pulse through OR gate 26 to flipflops 48, 50, 52 and 54. Thus sequence detector 16 is reset each time that it detects the counterclockwise sequence, so that the detection process can start again. Flipflops 48, 50, 52 and 54 are also reset by auto zero circuit 30 through OR gate 26. This initializes the stages of flipflops 48, 50, 52 and 54 at the beginning of each detection.

As has been described in detail with regard to sequence detector 14, the flipflops of sequence detector 16 will all ultimately latch $\overline{Q7}$-$\overline{Q10}$ to "0" when the counterclockwise sequence shown in FIG. 2B and 3B is present. If, on the other hand, the clockwise sequence of FIGS. 2A and 3A is present, the $\overline{Q7}$-$\overline{Q10}$ outputs will eventually all be latched "1", and NOR gate 56 will be disabled. Just as is the case with sequence detector 14, the discontinuity created when the auto zero reset is initially removed can cause one or two of the four flipflops of sequence detector 16 to be temporarily latched with a "0" output, but by the end of one period of the difference frequency $\Delta f$, all four outputs of flipflops 48, 50, 52 and 54 will be latched "1" if the clockwise sequence is present, or will be latched "0" if the counterclockwise sequence is present.

The sequence detection provided by the present invention has several important features. First, exactly one period of the different frequency $\Delta f$ will result in a determination of whether $f_{FSK}$ is greater than or less than $f_0$, regardless of where in the sequence the sequence detection begins.

Second, one flipflop is used for each transition of the sequence. Transitions which occur in the correct order cause all four flipflops to latch so that the output of the sequence detector 14 or 16 is switched to "1" to indicate successful detection of the sequence.

Third, by gating data with the appropriate combination of one bit which has changed and the other bit which has not changed, spurious edges in the outputs of sequence generator 10 due to noise cause at least one of the flipflops to be latched with a "1" output. This inhibits a false "1" output of the sequence detectors 14 and 16 from occurring due to noise.

The circuit of the present invention provides high noise immunity. The circuit is useful over a broad range of FSK deviation. Ratios of $f_{FSK}$ to $f_0$ of approximately 0.7 to approximately 1.3 are possible with the circuit of the present invention. The limit to the extent of $f_{FSK}$ deviation is the point at which the phase velocity between the FSK and REF signals is too fast to guarantee that each of the four two bit code values of the sequence will be sampled.

Although the circuit of the present invention is useful over a broad range of FSK deviation, it is particularly useful for narrow band FSK transmission, where the deviation (i.e. $\Delta f$) is very small. With the circuit of the present invention, no minimum deviation is required within the context of the circuit's ability to discriminate between $f_{FSK}$ greater than or less than $f_0$. All that is required is that $\Delta f$ be greater than zero (i.e. that some deviation exists), and that one cycle of $\Delta f$ be less than the period of the baud rate.

The demodulation of FSK signals with the circuit of the present invention is done totally in the digital domain. No analog integration is required as part of the circuitry which converts the FSK signal to a digital data stream.

The circuit of the present invention uses a minimum of digital circuitry, all of which is completely integrable on a monolithic integrated circuit chip. Although the embodiments of the present inventio shown in FIG. 1 and FIG. 4 illustrate the use of two sequence detectors, a pair of integrating shift registers and a decision circuit, other embodiments of the present invention utilize only a single sequence detector in conjunction with the sequence generator. In that case, the sequence detection requires only four flipflops and a NOR gate, while the sequence generation requires only two flipflops and an inverter.

Although the present invention has been described with reference to preferred embodiments, workers skilled in the art will recognize that changes may be made in form and detail without departing from the spirit and scope of the invention.

What is claimed is:

1. A circuit for determining whether an input signal has a frequency greater than or less than a reference signal, the circuit comprising:

means for producing a digital code as a function of the input and reference signals, the digital code being representative of a phase angle between the input and reference signals and changing in a first predetermined sequence when the frequency of the input signal is less than the frequency of the reference signal and changing in a second predetermined sequence when the frequency of the input signal is greater than the frequency of the reference signal;

means for providing a complementary digital code which is a complement of the digital code; and means for receiving both the digital code and the complementary digital code and producing an output indicating whether the input signal has a frequency greater than or less than the reference signal based upon the sequence of the digital code received.

2. The circuit of claim 1 wherein the digital code is a multibit binary code.

3. The circuit of claim 2 wherein the digital code is a two bit binary code.

4. A circuit for determining whether an input signal has a frequency greater than or less than a reference signal, the circuit comprising:

means for producing a digital code as a function of the input and reference signals where a first bit of the digital code is provided as a function of a state of one of the input and reference signals when the other signal changes from a first to a second state and where a second bit of the digital code is provided as a function of the state of the one signal when the other signal changes from the second state to the first state, the digital code being representative of a phase angle between the input and reference signals and changing in a first predetermined sequence when the frequency of the input signal is less than the frequency of the reference signal and changing in a second predetermined sequence when the frequency of the input signal is greater than the frequency of the reference signal; and means for receiving the digital code and producing an output indicating whether the input signal has a frequency greater than or less than the reference signal based upon the sequence of the digital code received.

5. The circuit of claim 4 wherein the one signal is the input signal and the other signal is the reference signal, and wherein the reference signal has a duty cycle which is less than a duty cycle of the input signal.

6. The circuit of claim 5 wherein the input signal and the reference signal are squarewave signals.

7. The circuit of claim 5 wherein the input signal has a duty cycle of approximately fifty percent and wherein the reference signal has a duty cycle of approximately twenty-five percent.

8. A circuit for determining whether an input signal has a frequency greater than or less than a reference signal, the circuit comprising:

means for producing a digital code as a function of the input and reference signals, the digital code being representative of a phase angle between the input and reference signals and changing in a first predetermined sequence when the frequency of the input signal is less than the frequency of the reference signal and changing in a second predetermined sequence when the frequency of the input signal is greater than the frequency of the reference signal; and means for receiving the digital code and sensing each of a plurality of predetermined transitions of the digital code indicative of one of the predetermined sequences and for producing an output based upon whether each of the plurality of predetermined transitions has been sensed thereby indicating whether the input signal has a frequency greater than or less than the reference signal based upon the sequence of the digital code received.

9. The circuit of claim 8 wherein the digital code is a two bit binary code and wherein the means for sensing each of a plurality of transitions comprises:

first flipflop means for providing a signal indicative of occurrence of a first predetermined transition of the two bit binary code;

second flipflop means for providing a signal indicative of occurrence of a second predetermined transition of the two bit binary code;

third flipflop means for providing a signal indicative of occurrence of a third predetermined transition of the two bit binary code; and fourth flipflop means for providing a signal indicative of occurrence of a fourth predetermined transition of the two bit binary code.

10. The circuit of claim 9 wherein the means for providing an output provides an output indicative of one of the predetermined sequences only when the signals from the first, second, third and fourth flipflop means each indicate occurrence of one of the predetermined transitions.

11. The circuit of claim 10 wherein each of the first, second, third and fourth flipflop means has a clock input responsive to a change in one of the bits of the two binary code and a data input for receiving a signal based upon a state of the other bit of the two bit binary code, and wherein the signals provided by the flipflop means are based upon the state of the other bit of the code when the one bit makes a predetermined change.

12. A circuit for determining whether an input signal has a frequency greater than or less than a reference signal, the circuit comprising:

means for producing a digital code, which is a two bit binary code, as a function of the input and reference signals, the digital code being representative of a phase angle between the input and reference signals and changing in a first predetermined sequence of "11" to "01" to "00" to "10" to "11" and so on when the frequency of the input signal is less than the frequency of the reference signal, and changing in a second predetermined sequence of "11" to "10" to "00" to $\mp$01" to "11" and so on when the frequency of the input signal is greater than the frequency of the reference signal; and means for receiving the digital code and producing an output indicating whether the input signal has a frequency greater than or less than the reference signal based upon the sequence of the digital code received.

13. A circuit for converting a frequency shift key (FSK) signal to a digital data stream, the circuit comprising:

sequence generator means for producing a digital code as a function of the FSK signal and a predetermined reference signal, the digital code being representative of a phase angle between the FSK and reference signals and changing in a first predetermined sequence when the FSK signal has a frequency which is less than the reference frequency, and changing in a second predetermined sequence when the frequency of the FSK signal is greater than the reference frequency;

means for providing a complementary digital code which is a complement of the digital code; and means for providing the data stream as a function of the sequence in which the digital code changes and the sequence in which the complementary digital code changes.

14. The circuit of claim 1 wherein the digital code is a multibit binary code.

15. The circuit of claim 14 wherein the digital code is a two bit binary code.

16. A circuit for converting a frequency shift key (FSK) signal to a digital data stream, the circuit comprising:

sequence generator means for producing a digital code as a function of the FSK signal and a predetermined reference signal where a first bit of the digital code is provided as a function of a state of one of the FSK and reference signals when the other signal changes from a first to a second state and where a second bit of the digital code is provided as a function of the state of the one signal when the other signal changes from the second state to the first state, the digital code being representative of a phase angle between the FSK and reference signals and changing in a first predetermined sequence when the FSK signal has a frequency which is less than the reference frequency, and changing in a second predetermined sequence when the frequency of the FSK signal is greater than the reference frequency; and means for providing the data stream as a function of the sequence in which the digital code changes.

17. The circuit of claim 16 wherein the one signal is the FSK signal and the other signal is the reference signal, and wherein the reference signal has a duty cycle which is less than a duty cycle of the FSK signal.

18. The circuit of claim 17 wherein the FSK signal and the reference signal are squarewave signals.

19. The circuit of claim 17 wherein the FSK signal has a duty cycle of approximately fifty percent and wherein the reference signal has a duty cycle of approximately twenty-five percent.

20. A circuit for converting a frequency shift key (FSK) signal to a digital data stream, the circuit comprising:

sequence generator means for producing a digital code as a function of the FSK signal and a predetermined reference signal, the digital code being representative of a phase angle between the FSK and reference signals and changing in a first predetermined sequence when the FSK has a frequency which is less than the reference frequency, and changing in a second predetermined sequence when the frequency of the FSK signal is greater than the reference frequency:

means for receiving the digital code and sensing each of a plurality of predetermined transitions of the digital code indicative of one of the predetermined sequences; and means for providing the data stream based upon whether each of the plurality of predetermined transitions has been sensed.

21. The circuit of claim 20 wherein the digital code is a two bit binary code and wherein the means for sensing each of a plurality of transitions comprises:

first flipflop means for providing a signal indicative of occurrence of a first predetermined transition of the two bit binary code;

second flipflop means for providing a signal indicative of occurrence of a second predetermined transition of the two bit binary code;

third flipflop means for providing a signal indicative of occurrence of a third predetermined transition of the two bit binary code; and fourth flip flop means for providing a signal indicative of occurrence of a fourth predetermined transition of the two bit binary code.

22. The circuit of claim 21 wherein the means for providing the data stream includes means for providing an output indicative of one of the predetermined sequences only when the signals from the first, second, third and fourth flipflop means each indicate occurrence of one of the predetermined transitions.

23. The circuit of claim 22 wherein each of the first, second, third and fourth flipflop means has a clock input responsive to a change in one of the bits of the two bit binary code and a data input for receiving a signal based upon a state of the other bit of the two bit binary code, and wherein the signals provided by the flipflop means are based upon the state of the other bit of the code when the one bit makes a predetermined change.

24. The circuit of claim 23 wherein the digital code is a two bit binary code and wherein the first predetermined sequence is "11" to "01" to "00" to "10" to "11" and so on, and wherein the second predetermined sequence is "11" to "10" to "00" to "01" to "11" and so on.

25. The circuit of claim 11 wherein the digital code is a two bit binary code, wherein the first predetermined sequence is "11" to "01" to "00" to "10" to "11" and so on, and wherein the second predetermined sequence is "11" to "10" to "00" to "01" to "11" and so on.

* * * * *